UNITED STATES PATENT OFFICE.

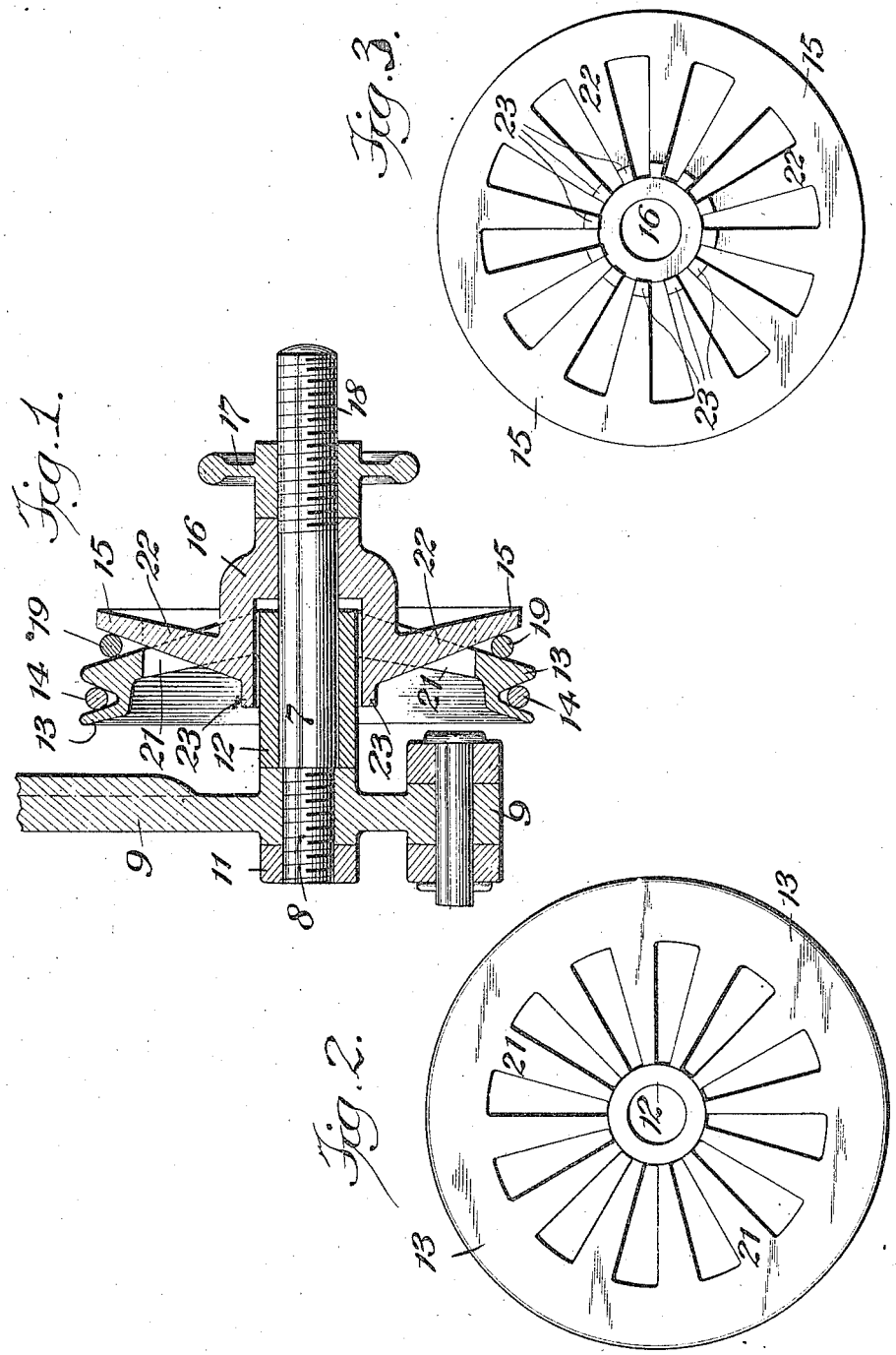

JOHN G. JONES, OF ROCHESTER, NEW YORK, ASSIGNOR TO M. D. KNOWLTON COMPANY, OF ROCHESTER, NEW YORK, A CORPORATION OF NEW YORK.

VARIABLE-SPEED POWER-TRANSMITTING MECHANISM.

975,869.   Specification of Letters Patent.   Patented Nov. 15, 1910.

Application filed August 30, 1906. Serial No. 332,576.

*To all whom it may concern:*

Be it known that I, JOHN G. JONES, citizen of the United States, and resident of Rochester, in the county of Monroe and State of New York, have invented certain new and useful Variable-Speed Power-Transmitting Mechanism, of which the following is a specification.

This invention relates to a mechanism adapted to transmit power from a driving shaft to a driven shaft, in such manner as to permit the speed of rotation of the driven shaft, of any machine or device operated thereby, to be varied easily, quickly and noiselessly by the attendant as circumstances may require.

The invention comprises a power-transmitting mechanism including two opposed rotative parts, each of which has a series of laterally inclined fingers entering openings in the opposing part and causing the adjacent external surfaces of the fingers to form a belt receiving face which may be varied in circumference by laterally adjusting either of said rotative parts relatively to the other part; one series of fingers being preferably prolonged laterally at the inner parts to prevent catching or binding of the power-transmitting belt between the two opposed rotative parts when they are relatively adjusted for operating a machine or device at minimum speed.

Referring now to the accompanying drawings forming a part of this specification; Figure 1 is a vertical sectional view of the invention in the plane of the axis of rotation. Figs. 2 and 3 are views of the inner or opposing faces of the two belt carrying parts of the power-transmitter.

In the drawings, the numeral 7 indicates a short shaft having an inner threaded end 8 screwed firmly into a bracket or other fixed support 9 and locked thereon by means of a nut or threaded collar 11, rotatively mounted upon the fixed shaft 7. Adjacent the bracket 9 is the hub 12 of the inner main wheel or part 13, the periphery of which is shown as a pulley face receiving a driving belt 14, delivering power from any suitable prime motor for rotating the part 13 at any desired constant speed. The belt face of the part 13 is shown grooved to receive the belt 14, which, in this instance, is round, but said belt surface may be flat or curved to take a flat belt; or said wheel or part 13 may be rotated by toothed or friction gearing or in any other manner.

Opposing the rotative wheel or part 13 is another rotative wheel or part 15, the hub 16 of which may slide on the shaft 7, and as shown, partly overlaps the hub 12 of the part 13. Any suitable means may be provided for holding the part 15 at any desired adjusted position on the shaft 7, relatively to the opposing rotative part 13. A simple device for this purpose is a hand-wheel nut 17, fitted to screw threads 18 on the outer end of the shaft 7. Between the opposing faces of the rotative parts 13, 15, is fitted a power-transmitting belt 19, which passes around a pulley on a shaft to be driven. It is preferred to laterally incline the opposing faces of both wheels or parts 13, 15, and to form said respective parts with series of radial fingers or fins 21, 22, with intervening spaces or openings to permit the fingers of one part entering the spaces between the fingers of the other part. It is also preferred to form the fingers of one part, say the part 15, with inner lateral prolongations 23.

It is obvious that when the part 15 is moved laterally outward on the shaft 7, the fingers 22 of this rotative part or wheel will withdraw more or less from the spokes or fingers 21 of the opposite rotative part or wheel 13 and that thereby the circumference of the contact face for the belt 19 formed between the inclined faces of the parts 13, 15, will be correspondingly reduced, and therefore likewise reducing the speed of rotation of the shaft driven by the belt 19. When the parts 13, 15, have the relative adjustment shown in Fig. 5 the mutually formed belt groove for the power-transmitting belt 19, has maximum circumference for giving relatively high speed to said belt, and when said parts 13, 15, are separated laterally on the shaft 7, the mutually formed belt groove will have less circumference depending on the amount of separation between the parts 13, 15, and therefore the speed imparted to the belt 19 will be relatively less. When said parts are separated to their greatest extent the series of lateral finger prolongations 23 are brought into service as the inner part or bottom of the belt groove and prevent the belt 19 from binding at what otherwise would be a comparatively sharp inner angle between inclined faces of the opposed rotative parts 13, 15. Any desired intermediate rotative speed of the shaft to be driven may be obtained by laterally adjusting the part 15 on the shaft 7 to the required intermediate position for obtaining the necessary circumference of the belt face formed between the opposing parts 13, 15. The nut or hand-wheel 17 is turned on the shaft thread 18 so as to abut the hub 16 of the part 15, for holding the latter at any required adjusted position. The belt contact face of but one of the rotative fingered parts 13, 15, needs to be laterally inclined, but this would cause a much slower variation of the belt face circumference by lateral relative adjustment of the two parts, hence, the illustrated construction with the belt contact faces of both parts 13, 15, laterally inclined, is preferred in practice.

I claim as my invention:—

A power transmitting mechanism comprising a fixed shaft, two opposed parts rotatively mounted directly on said shaft, the hub of one of said parts partially incasing but out of contact with the hub of the other part, each of said parts having a series of spaced laterally inclined fingers entering openings between the fingers of the other part, thereby forming at the outer inclined faces of the two engaging series of fingers a belt receiving face, the circumference of which is variable by laterally adjusting one of said rotative parts, one of said parts having a circumferential series of inner and laterally projecting fingers overlying the hub of the other part, said fingers providing a way upon which the belt runs during minimum circumferential belt face adjustment of the correlated series of fingers of both rotative parts, and a manually operated nut threaded on said shaft and bearing against the hub of one of said parts for effecting lateral adjustment of said part.

Signed at Rochester, in the county of Monroe and State of New York this 25th day of August A. D. 1906.

JOHN G. JONES.

Witnesses:
BERTHA E. GARDNER,
NELSON P. SANFORD.